Figure 1:
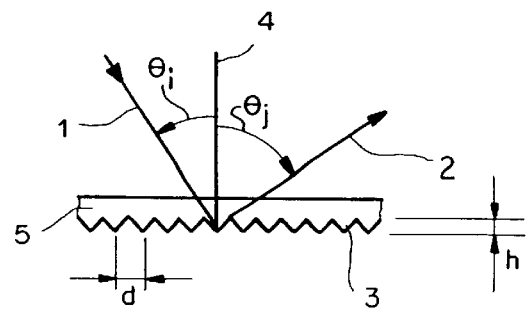

United States Patent
Staub et al.

[11] Patent Number: 5,969,863
[45] Date of Patent: Oct. 19, 1999

[54] SURFACE PATTERN INCLUDING LIGHT-DIFFRACTING RELIEF STRUCTURES

[75] Inventors: René Staub, Cham; Wayne Robert Tompkin, Ennetbaden, both of Switzerland

[73] Assignee: Electrowatt Technology Innovation Corp., Zug, Switzerland

[21] Appl. No.: 09/117,305

[22] PCT Filed: Jun. 17, 1996

[86] PCT No.: PCT/EP96/02599

§ 371 Date: Sep. 3, 1998

§ 102(e) Date: Sep. 3, 1998

[87] PCT Pub. No.: WO97/27504

PCT Pub. Date: Jul. 31, 1997

[30] Foreign Application Priority Data

Jan. 26, 1996 [CH] Switzerland ............... 00210/96

[51] Int. Cl.[6] .............. G02B 5/18; G02B 27/44; B42D 15/10
[52] U.S. Cl. ............ 359/567; 359/572; 359/576; 359/2; 283/902
[58] Field of Search .................. 359/566, 567, 359/572, 576, 2; 283/902, 86

[56] References Cited

U.S. PATENT DOCUMENTS

| 734,134 | 7/1903 | Porter | 359/567 |
|---|---|---|---|
| 4,568,141 | 2/1986 | Antes | 359/2 |
| 5,058,992 | 10/1991 | Takahashi | 359/567 |
| 5,483,363 | 1/1996 | Holmes et al. | 359/2 |
| 5,627,663 | 5/1997 | Horan et al. | 359/1 |
| 5,886,798 | 3/1999 | Staub et al. | 359/2 |

FOREIGN PATENT DOCUMENTS

WO 95/02200 1/1995 WIPO.

*Primary Examiner*—Jon Henry
*Attorney, Agent, or Firm*—Proskauer Rose LLP

[57] ABSTRACT

A surface pattern has two surface portions with microscopically fine, light-diffracting relief structures. The relief structures are in the form of grating structures GS1 and GS2, respectively, which are composed of at least two superimposed gratings G1 and G2, G3 and G4, respectively. The light-diffracting properties of the gratings G1 to G4 are so selected in accordance with various criteria that novel optical effects which cannot be holographically copied can be achieved with the grating structures GS1 and GS2. Such surface patterns are suitable as optical security elements for documents or articles of all kinds as well as packing foils.

13 Claims, 6 Drawing Sheets

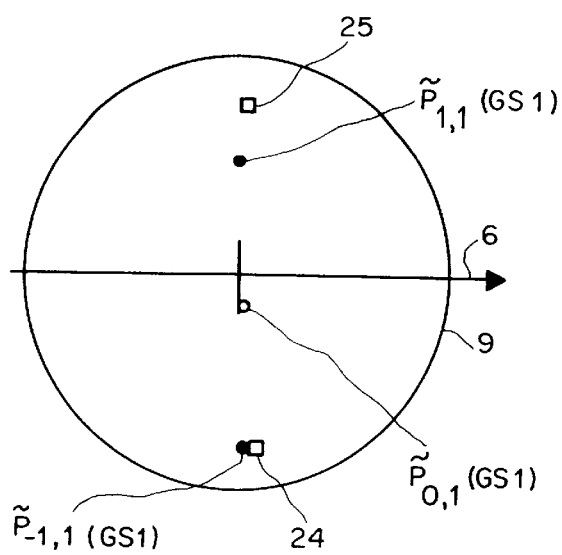
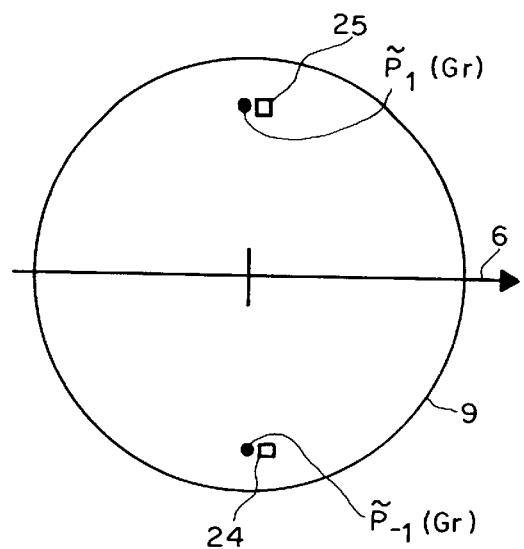
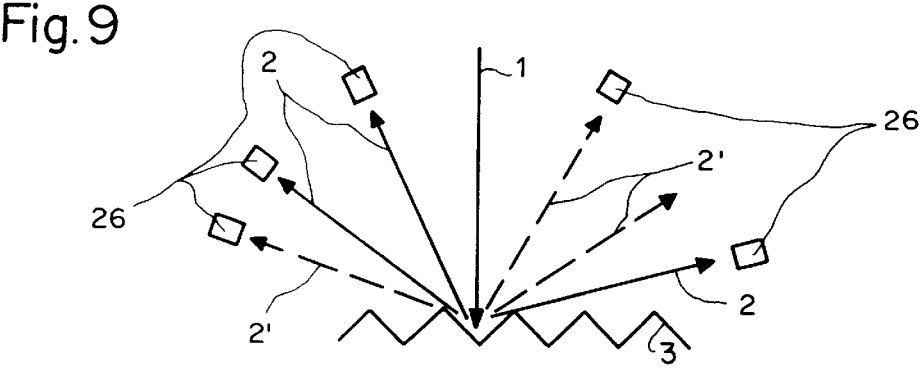
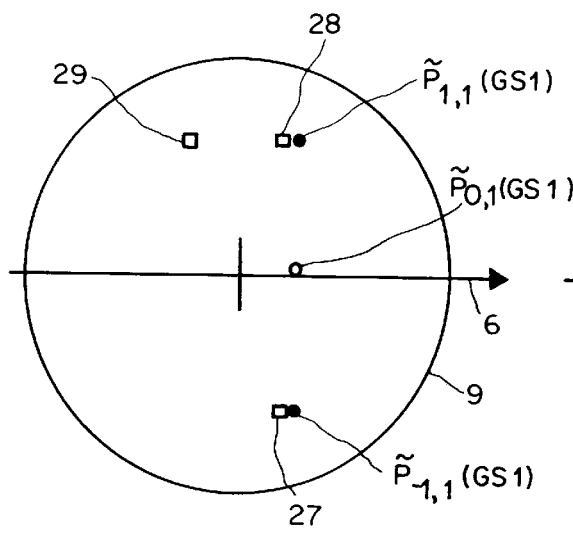
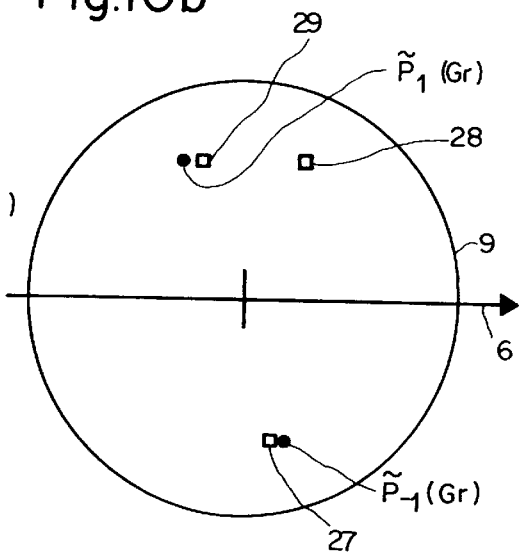

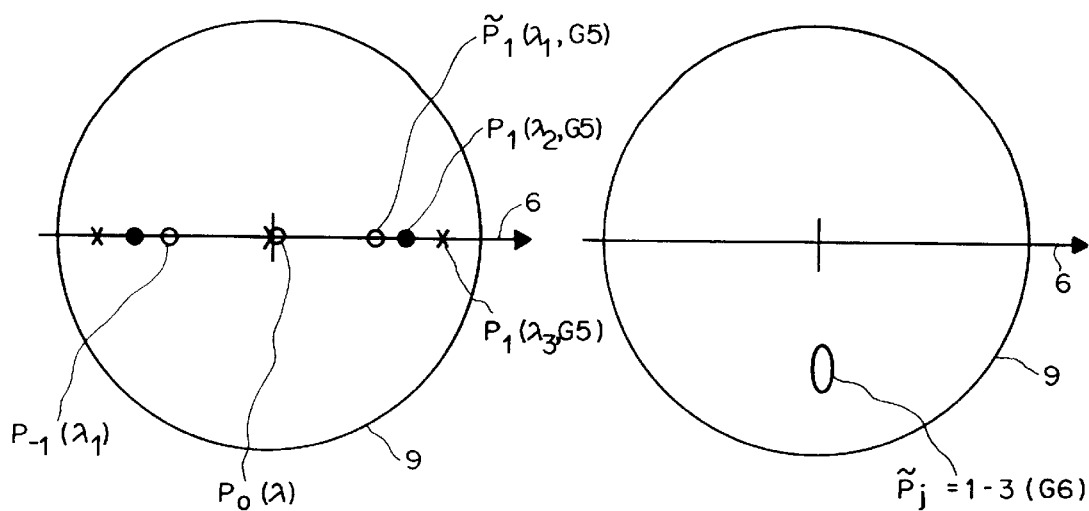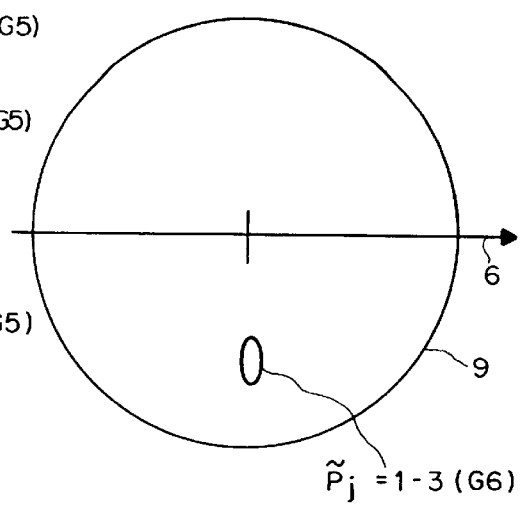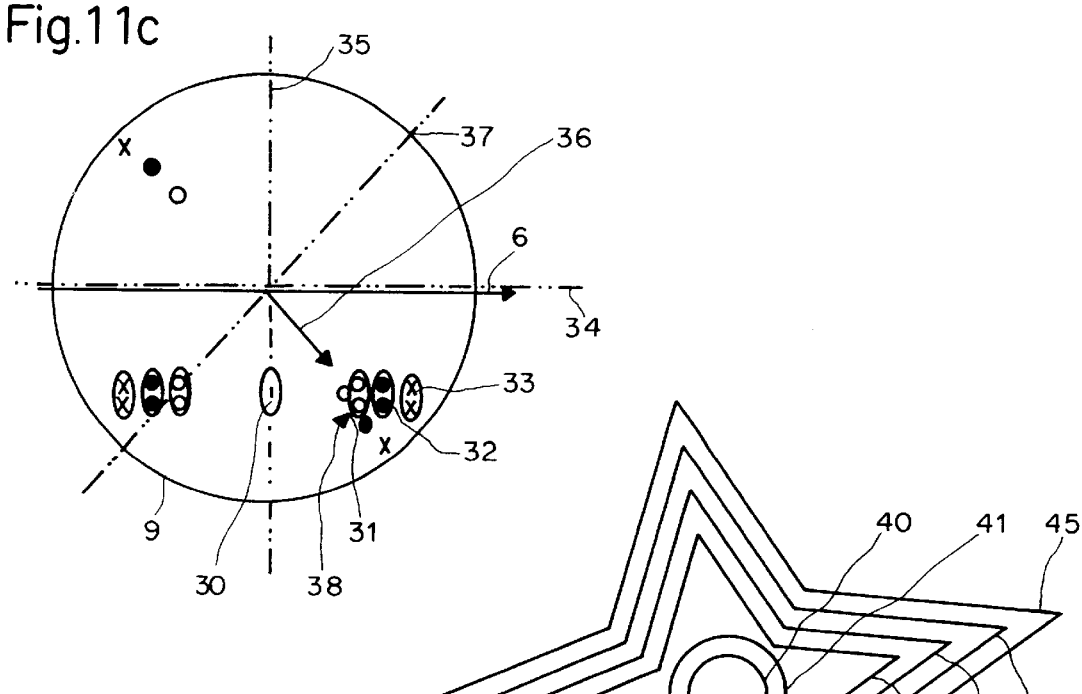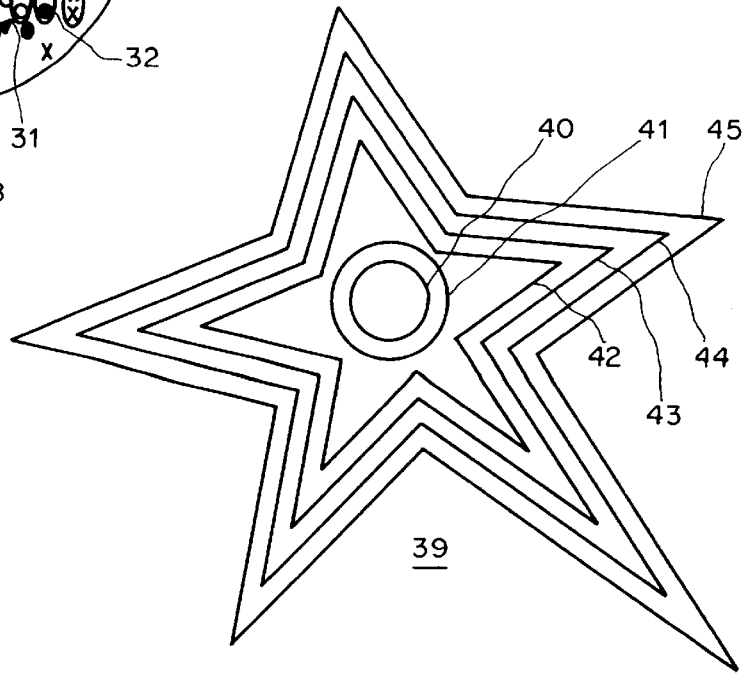

SURFACE PATTERN INCLUDING LIGHT-DIFFRACTING RELIEF STRUCTURES

The invention relates to a surface pattern of the kind set forth in the generic part of claim 1 and 12.

Such surface patterns with a microscopically fine relief structure are suitable for example for increasing the level of safeguard against forgery and/or the conspicuous identification of articles of all kinds and can be used in particular in relation to value-bearing papers or bonds, passes, payment means and similar articles to be safeguarded, as optical information carriers. Such surface patterns are also suitable for packaging foils.

The EP-A 0 467 601 discloses a light diffracting surface pattern divided into regions with different gratings. The regions may comprise overlays of two different gratings, e.g. as shown in the EP-A 0 357 837 the gratings may be parallel and differ in their spatial frequency. On the other hand, the WO 95/02200 teaches how to superimpose several diffractive structures so that each of the diffractive structure gives rise to a distinct diffraction image or component thereof.

The object of the present invention is to provide a surface pattern having conspicuous patterns of optical grating structures, which is difficult to forge.

In accordance with the invention the specified object is attained by the characterising features of claim 1 and claim 12. Particular embodiments of the invention are characterised in the dependent claims.

Figure 2:
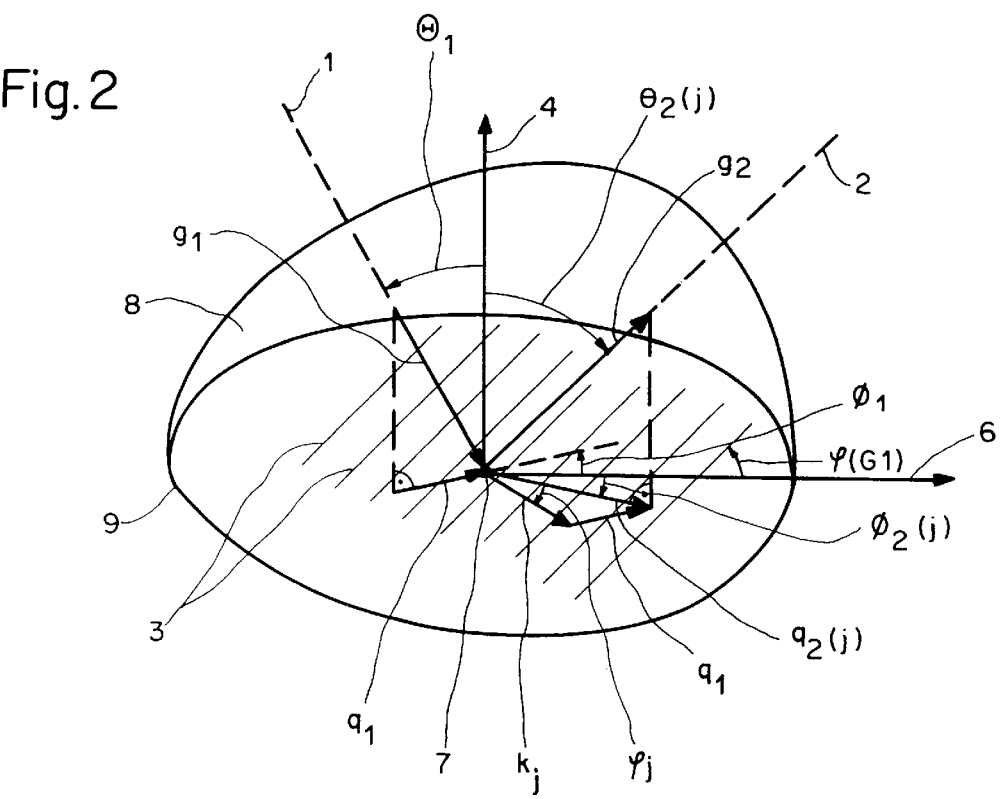
Figure 3:
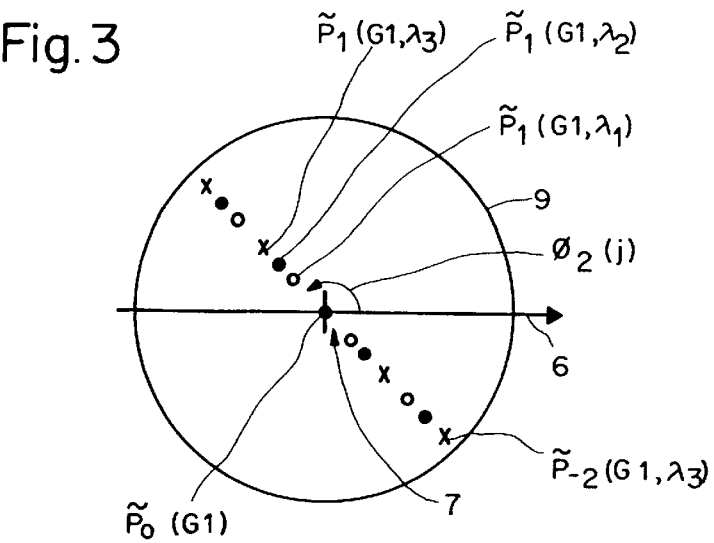
Figure 4:
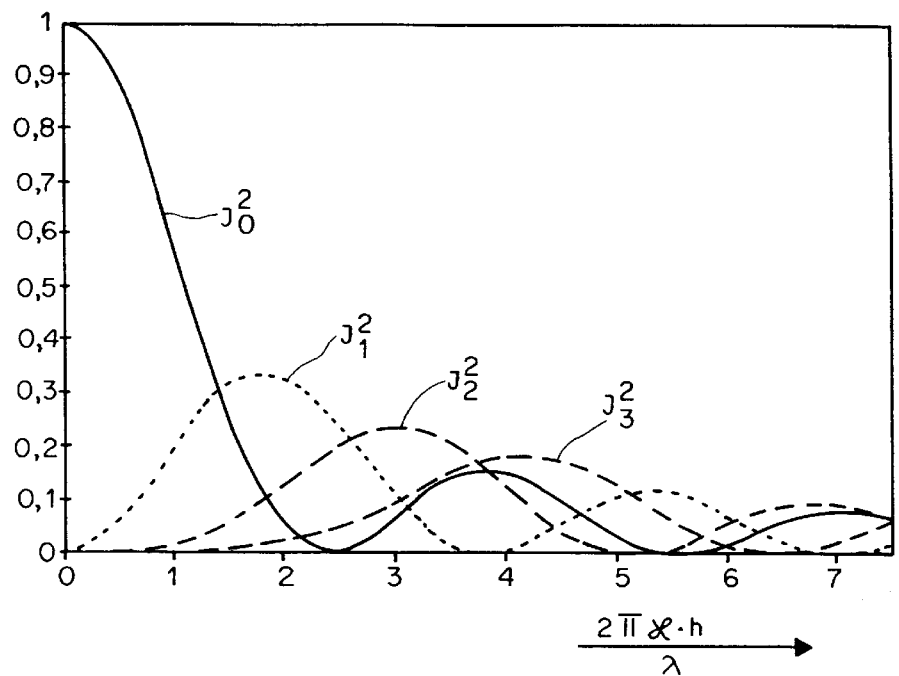
Figure 5A:
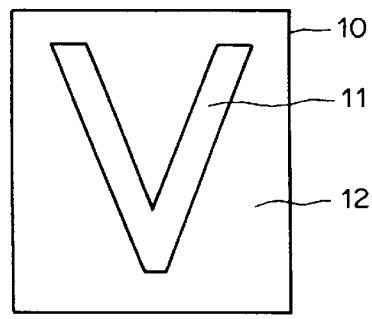
Figure 5B:
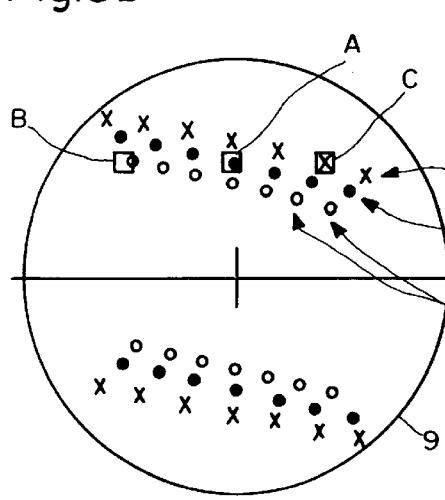
Figure 6A:
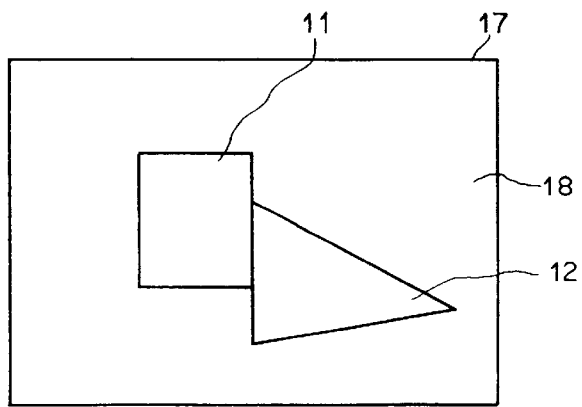
Figure 6B:
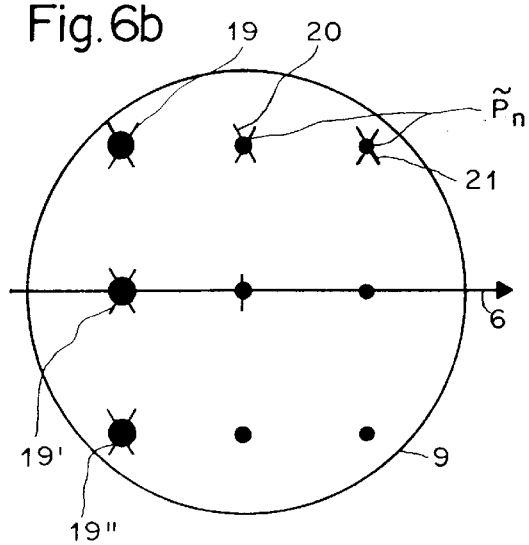
Figure 6C:
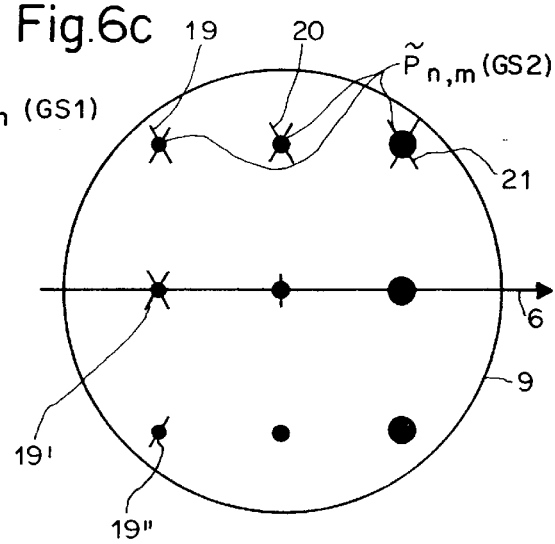
Figure 7:
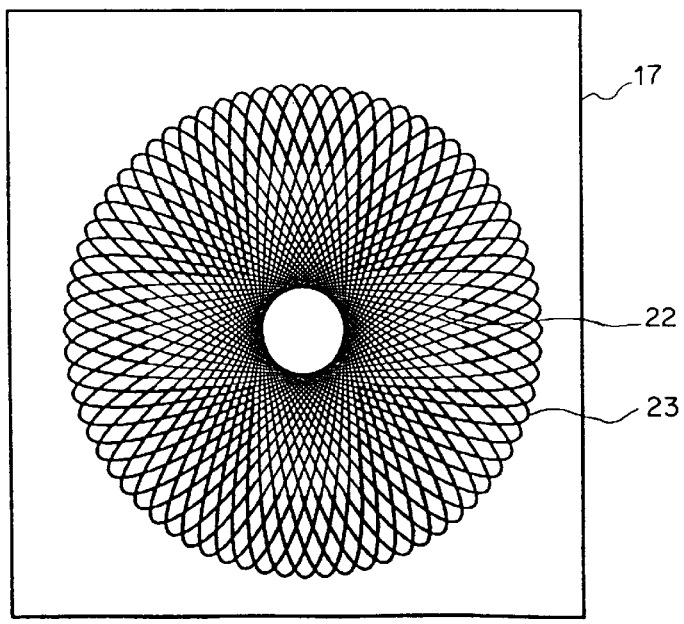
Figure 12B:
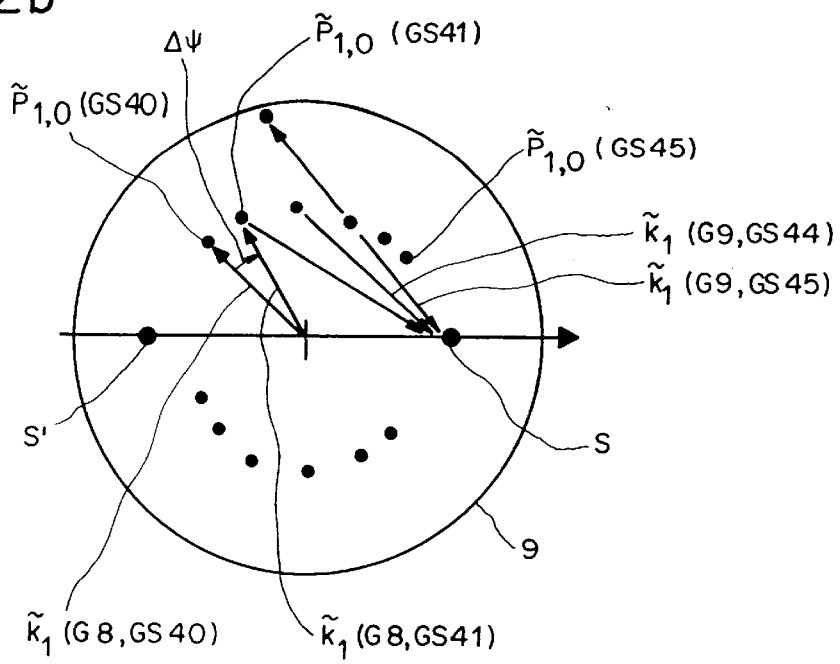
Figure 13:
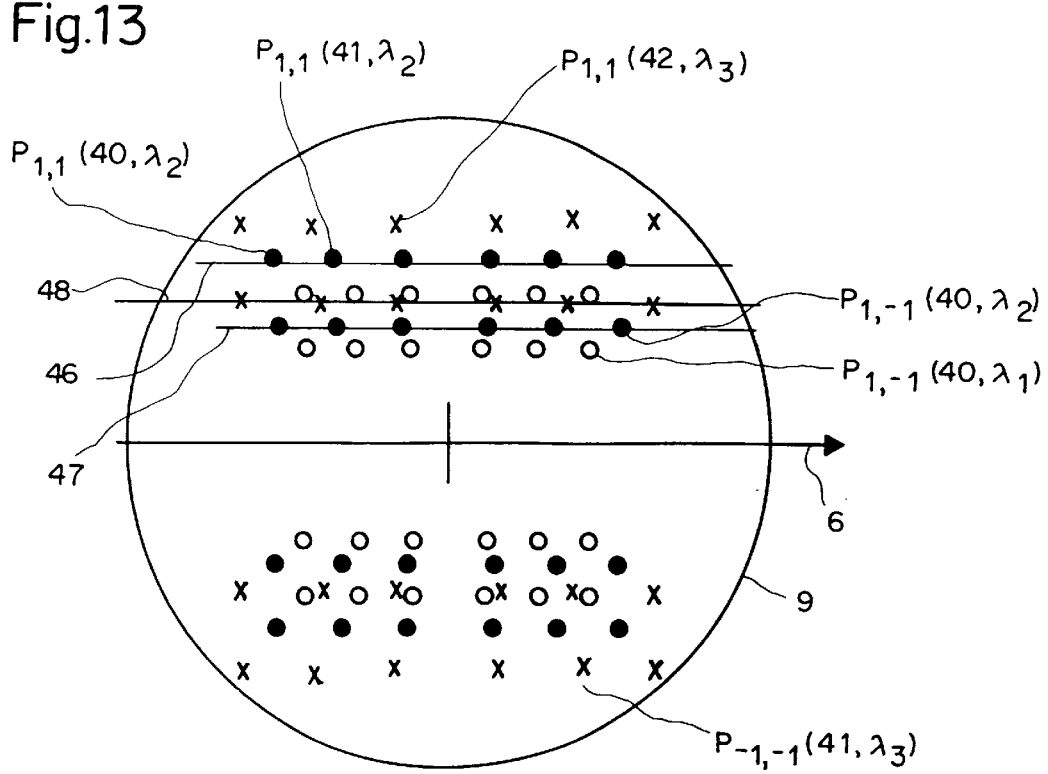

A complete understanding of the present invention will be accomplished by reading the detailed description of a preferred embodiment thereof in conjunction with the drawings, wherein is shown in FIG. 1: a grating,
FIG. 2: a hemisphere,
FIG. 3: a scaled grating vector circle,
FIG. 4: squared Bessel functions,
FIG. 5a: first surface pattern
FIGS. 5b+c: the vector circles of the first surface pattern,
FIG. 6: a second surface pattern,
FIGS. 6b+c: the vector circles of the second surface pattern,
FIG. 7: graphic elements,
FIG. 8a: the vector circle of the grating composed of two parallel gratings,
FIG. 8b: the vector circle of a reference grating,
FIG. 9: light diffracted by the superimposed grating GS,
FIG. 10a: the vector circle of the grating composed of two perpendicular gratings,
FIG. 10b: the vector circle of the reference grating,
FIG. 11a: the vector circle of the grating G5,
FIG. 11b: the vector circle of the grating G6,
FIG. 11c: the vector circle of the grating composed of the perpendicular grating G5 and G6,
FIG. 12a: a pattern made of discrete closed lines,
FIG. 12b the vector circle of the gratings composed of a first set of pairs and
FIG. 13: the vector circle of the gratings composed of a second set of pairs.

For understanding of the invention, some fundamental facts of the light-diffracting properties of gratings reflecting the incident light in the context of the Fraunhofer diffraction theory are briefly described with reference to FIGS. 1 to 4. A grating G1 which is arranged in a plane and which is in the form of a relief and which is formed with rectilinear, regularly arranged furrows 3 can be characterised by the parameters line spacing d, profile shape, profile height h and orientation j of the grating furrows 3 in the plane. The angle j is referred to as the azimuth angle. A monochromatic light beam 1 of the wavelength I which impinges onto such a grating G1 with microscopically fine dimensions is diffracted into a finite number of discrete diffraction orders in accordance with the equation:

$$\sin(q_j) = \sin(q_i) + j*l/d \quad (1)$$

wherein, as shown in FIG. 1, the angle of incidence $q_i$ and the diffraction angle $q_j$ denote the intermediate angles between the line 4 which is normal to the plane of the grating G1 and the incident beam 1 or the reflectedly-diffracted beam 2 respectively, and the integral index j denotes the diffraction order. Equation (1) applies for the situation where the light beam 1 is in a plane which is perpendicular to the furrows 3 of the grating G1. Only a single diffracted beam 2 is shown in FIG. 1. Varying the line spacing d makes it possible to determine the maximum number p of the possible diffraction orders which occur for example in the event of perpendicular incidence of the light, that is to say $q_i=0$, wherein the number p does not have to be the same for all wavelengths I which are in the visible range. The levels of intensity of the light diffracted into the various diffraction orders can be controlled to a great extent by varying the profile shape and/or the profile height h. In addition, with asymmetrical profile shapes, more light can be diffracted into the positive diffraction orders than the negative diffraction orders (or vice versa), that is to say the intensity $I_{+m}(\lambda)$ of the light diffracted into the positive diffraction order +m is greater than the intensity $I_{-m}(\lambda)$ of the light which is diffracted into the negative diffraction order −m. As can be seen from equation (1), polychromatic light is broken up by the grating G1 into its spectral colours. Light of different wavelengths $\lambda$ therefore is diffracted in each diffraction order j in different directions which with the same angle of incidence $\theta_i$ differ by the diffraction angle $\theta_j(\lambda)$ which is dependent on the wavelength $\lambda$. The grating G1 is generally covered with a protective lacquer layer 5 which levels off the furrows 3.

Hereinafter reference will be made to FIG. 2 for diagrammatically showing a structure which is based on quantum-mechanical ideas and by means of which the directions of the light beams 2 diffracted at the grating G1 can be determined in a simple fashion. This structure is in substance to be found in the illustration on pages 52–53 of the book "Diffraction Gratings" by M. C. Hutley which appeared in 1982 from Academic Press. The considerations involved firstly apply in respect of a directed monochromatic light beam 1 which is reflectedly diffracted at the grating G1 which is illustrated with its furrows 3. Associated with each photon of the incident light beam 1 is a wave vector $g_1$ whose magnitude $$|g_1| = 2\pi/\lambda \quad (2)$$

depends on the wavelength $\lambda$. The direction of the wave vector $g_1$ which is characterisable by the polar angles $\psi=\phi_1$, $\theta_i=\Theta_1$ in relation to any reference direction 6 in the plane of the grating G1 or the line 4 normal to the grating G1 respectively is equal to the direction of the light beam 1. The wave vector $g_1$ is thus equal to the pulse of the photon, divided by Planck's constant h.

Likewise associated with a photon which is diffracted into the diffraction order j is a wave vector $g_2(j)$ which faces in the direction of the diffracted light beam 2. The wave vector $g_2(j)$ can be written by its polar coordinates ($\phi_2(j)$, $\theta_2(j)$, $|g_2(j)|$). In addition the vector components, which are in the plane of the grating G1, of the wave vectors $g_1$ and $g_2(j)$ are identified by $q_1$ and $q_2(j)$ respectively. By virtue of equation (2) the magnitude of the vector component $q_1$ depends on the wavelength $\lambda$.

Associated with each diffraction order j of the grating G is a grating vector $k_j(G1)$ which is in the plane of the grating G1 and which is referred to as the k-vector. The polar angles of the grating vectors $k_j(G1)$ are identified by $\psi_j$ and $\theta_j$. The k-plane is so oriented relative to the reference direction 6 that the grating vectors $k_j(G1)$ in the plane of the grating G1 are oriented perpendicularly to the furrows 3 so that the azimuth angles $\psi_j$ of the k-vectors $k_j$ of all diffraction orders j are equal to the angle $$\psi_j = \psi(G1) + 90° \text{ modulo } 360° \qquad (3)$$

The angles $\theta_j$ of the k-vectors $k_j$ are in accordance with the definition as follows:

$$\theta_j = 90° \qquad (4)$$

The magnitude of the k-vectors $k_j(G1)$ is dependent on the index j of the diffraction order:

$$|k_j| = |j * 2\pi/d| \qquad (5)$$

The vector components $q_1$ and $q_2(j)$ of the wave vectors $g_1$ and $g_2(j)$ respectively are linked by the following equation:

$$q_2(j) = q_1 + k_j, \qquad (6)$$

which says that the pulse component of the photon, which is in the plane of the grating G1, upon diffraction experiences a pulse change which is proportional to the grating vector $k_j$. Because of the conversation of energy—the light does not change its colour upon diffraction—the magnitude of the wave vector $g_2(j)$ is equal to the magnitude of the wave vector $g_1$:

$$|g_2(j)| = |g_1| \qquad (7)$$

Now, by virtue of equations (6) and (7) it is possible to determine in a simple manner, for example graphically, the direction of the wave vector $g_2(j)$, that is to say the light diffracted at the grating G1 in the diffraction order j. The plane of the k-vectors $k_j$, the so-called k-plane, is fixedly joined to the grating G1. The wave vector $g_1$ is now represented as a vector which is directed towards the centre point 7 of a hemisphere 8 arranged over the k-plane. It is then also possible to draw in the vector component $q_1$ thereof. The radius R of the hemisphere 8 is equal to the magnitude of the wave vector $g_1$ and thus reciprocally proportional to the wavelength $\lambda$ of the monochromatic light beam 1:

$$R = |g_1| = 2\pi/\lambda \qquad (8)$$

By vectorial addition of any grating vector $k_j$ to the vector component $q_1$, in accordance with equation (6) that gives the vector component $q_2(j)$ of the diffraction order j which is now entered as a vector starting from the centre point 7 of the k-circle. The polar angle $\phi_2(j)$ of the wave vector $g_2(j)$ is thus determined. Because of the equations (6), (7) and (8) the angle $\theta_2(j)$ is such that the tip of the wave vector $g_2(j)$ intersects the hemisphere 8 perpendicularly above the tip of the vector $q_2(j)$. The wave vector $g_2(j)$ thus appears as a vector which is directed from the centre point 7 onto a point on the surface of the hemisphere 8.

As the diffraction angle $\theta_2(j)$ can be at most 90°, all permitted vectors $q_2(j)$ lie within the k-circle 9 which is formed as the line of intersection of the hemisphere 8 with the k-plane and whose radius R thus corresponds to the diffraction angle $\theta_2(j) = 90°$. The centre point of the k-circle 9 is associated with the diffraction angle $\theta = 0°$.

When now two gratings G1 and G2 are superimposed to provide a grating structure GS, k-vectors $k_{m,n}(GS)$ can be associated with the grating structure GS, which k-vectors are composed as the sum of any k-vector of the first grating $k_m(G1)$ and any k-vector of the second grating $k_n(G2)$:

$$k_{m,n}(GS) = k_m(G1) + k_n(G2) \qquad (9)$$

The diffraction orders which upon the diffraction of light occur at the grating structure GS can now be written in a similar manner by q-vectors $q_2(m,n,GS)$ which are given in accordance with equations (5) and (9) by:

$$q_2(m,n,GS0 = k_{j=m}(G1) + k_{j=n}(G2) + q_1(\lambda) \qquad (10)$$

A diffraction order whose vector $q_2(m,n,GS)$ lies outside the radius R of the k-circle 9 defined by the equation (7) naturally does not occur.

The levels of intensity $I_{m,n}(GS,\lambda)$ of the diffraction orders are given as a good approximation by the product of the individual levels of intensity:

$$I_{m,n}(GS,\lambda) = I_m(G1,\lambda) * I_n(G2,\lambda) \qquad (11)$$

If now a predetermined diffraction order h for example of the first grating G1 has a practically vanishing level of intensity $I_{j=h}(G1,\lambda) \approx 0$, then all diffraction orders with the vector $q_2(m=h,n,GS)$ of the superimposed grating structure GS also have a low level of intensity: $I_{m=h,n}(GS,\lambda) \approx 0$.

In order to avoid unnecessary complications hereinafter the vector $q_2$ means a vector $q_2(j)$ when reference is made to the grating G1 and a vector $q_2(m,n,GS)$ when reference is made to the grating structure GS. This applies in a similar manner for other parameters such as for example $\phi_2(j)$, $\phi_2(n,m)$, etc., and also for those which are only defined hereinafter.

As a diffraction order whose three-dimensional direction is defined by the associated pair of angles($\phi_2$, $\theta_2$) is associated with each vector $q_2$, the direction in which light of which colour is diffracted is immediately apparent in the k-plane, in particular if only those vectors $q_2$ are shown whose levels of intensity are perceptible by a viewer under normal lighting conditions.

Of special interest hereinafter are the vectors $q_2$ for light whose wavelength is in the range of 390 nm to 760 nm, that is to say in the visible spectral range $\Gamma$. As the level of sensitivity of the human eye is drastically reduced at wavelengths $\lambda$ in the vicinity of the limits of visibility, it is generally sufficient to analyse the optical-diffraction characteristics of the grating G1 or the grating structure GS at the three wavelengths $\lambda_1 = 450$ nm (blue), $\lambda_2 = 550$ nm (green) and $\lambda_3 = 650$ nm (red). In consideration of the equation (8) the radius of the hemisphere 8 vanes in dependence on the wavelength $\lambda$ of the light of the incident beam 1. As hereinafter the individual diffraction angle $\theta_2$ is of less interest than other properties of a graphic configuration based on different grating structures GS, it is useful to consider the properties of the light diffracted into the possible diffraction orders, only on the basis of the vectors $q_2$ which are disposed in the k-plane. It is clear from FIG. 2 that the diffraction angle $\theta_2(j)$ increases with increasing distance of the tip of the vector $q_2(j)$ from the centre point 7 of the k-circle 9. A diffracted order additionally occurs only when the tip of its vector $q_2$ lies within the k-circle 9.

So that the diffraction behaviour of polychromatic light can be easily seen, in a next step the hemispheres 8 associated with different wavelengths λ and the corresponding k-planes are so scaled that a single hemisphere 8 and therewith a single k-circle 9 can be drawn for light of all wavelengths λ. As the radius R of the hemisphere 8 in accordance with equation (8) is inversely proportional to the wavelength λ, for example the hemisphere 8 for blue light is contracted and the hemisphere 8 for red light is increased in size until they coincide with the hemisphere 8 for green light ($\lambda_r=\lambda_2=550$ nm). The result of this is that the length of the grating vectors $k_j$ for non-green light is also contracted or increased and thus becomes dependent on the wavelength λ:

$$k_j(\lambda)=\lambda/\lambda_r k_j \qquad (12)$$

In return the magnitude of the vector $\tilde{q}_1$ becomes independent of the wavelength λ.

The vectors $q_2$ can be transformed into vectors $\tilde{q}_2$ which in accordance with equations (6), and (10) and (12) respectively are respectively given by the following $$\tilde{q}_2(j,\lambda)=\tilde{q}_1+\tilde{k}_j(\lambda) \qquad (13)$$

and $$\tilde{q}_2(n,m,GS,\lambda)=\tilde{q}_1+\tilde{k}_{n,m}(GS,\lambda) \qquad (14)$$

FIG. 3 now shows a single $\tilde{k}$-circle 9 which marks the diffraction angle θ=90° for all wavelengths λ. For the grating G1 and the light beam 1 which is incident at the angles $\psi=\phi_1$, $\theta=\Theta_1$, points $\underline{P}_j(G1,\lambda)$ are shown instead of the vectors $\tilde{q}_2(j,\lambda)$. The points $\tilde{P}_j(G1,\lambda)$ correspond to the tips of the vectors $\tilde{q}_2(j,\lambda)$ on the hemisphere 8 (FIG. 2). An open circle, a black circle and a cross are respectively used to represent the points $\tilde{P}_j(G1,\lambda)$ for the three wavelengths $\lambda_1$=450 nm (blue), $\lambda_2$=550 nm (green) and $\lambda_3$=650 nm (red). In the case of the zero diffraction order j=0 which corresponds to mirror reflection at the plane of the grating structure GS, the open circle, the black circle and the cross coincide: the diffraction angle $\theta_{j=0}$ is independent of the wavelength λ. With the other illustrated diffraction orders j=−2, −1, +1 and +2, dispersion occurs within the diffraction order in accordance with the wavelength dependency of the vectors $\tilde{q}_2(j\neq 0,\lambda)$. The view in FIG. 3 and the following Figures corresponds for the sake of simplicity to perpendicular incidence of the light beam 1 (FIG. 2), that is to say the angle $\Theta_1$ disappears. When light incidence is not perpendicular each point $\tilde{P}_j(G1,\lambda)$ is to be displaced by the vector $q_1$.

The levels of intensity $I_j(G1, \lambda)$, depend on the profile shape and the profile height h (FIG. 1) of the grating G1 and the refractive index K of the lacquer layer 5 (FIG. 1) which possibly levels off the grating G1. It is known (for example from the book "Introduction to Fourier Optics" by J. W. Goodman, McGraw-Hill, in the section relating to "sinusoidal phase grating" on pages 69–70) that in the case of a sinusoidal profile shape the levels of intensity $I_j$ of the various diffraction orders j which are calculated on the basis of simple scalar theory, are given by the square of the Bessel functions J $$I_j(h,\lambda)=J_j^2(2\pi*h*\kappa/\lambda) \qquad (15)$$

For symmetry reasons the following applies: $I_{-j}(h, \lambda)=I_j(h,\lambda)$. FIG. 4 shows the squared Bessel functions $J_0^2, J_1^2, J_2^2$ and $J_3^2$ in dependence on $2\pi*h*\kappa/\lambda$. The levels of intensity $I_j(h,\lambda)$ are also to be multiplied by the reflection factor of the reflection layer. In the case of aluminium the reflection factor for visible light is about 0.9 while for chromium it is 0.5.

In accordance with the invention, diffraction-optical effects of a completely new kind can be achieved with grating structures GS which comprise at least two superimposed gratings G1, G2. In order clearly to show the effects which can be perceived by a viewer, use is advantageously made of a graphic configuration which is subdivided into at least two surfaces or at least two groups of surfaces, wherein two different grating structures which serve as mutual referencing are present in the two surfaces or in the two groups of surfaces. However a conventional grating can also serve as the reference structure. The two surfaces or the two groups of surfaces, hereinafter only referred to as the two surfaces for the sake of simplicity in terms of the language used, now experience for example a change in colour and/or brightness which can result in contrast reversal, upon being tilted and/or rotated: the pattern comprising the two, preferably interlocking surfaces appears red and blue from a first viewing angle, only green from a second viewing angle and thus as a single contrast-less surface, while from a third viewing angle the pattern is visible in the reversed colour contrast as blue and red. In another example a given surface does not change its colour within a predetermined range of tilting movement, while a reference surface changes its colour, etc. The grating structures GS are formed from at least two superimposed gratings G1, G2 in such a way that at least one diffraction order which has an index pair (m≠0, n) or (m, n≠0) has a high level of intensity $I_{m,n}(GS)$, quite in contrast to the teaching of international patent application WO 95/02200 where such intermodulation terms are to be as slight as possible. Particularly the use of gratings G1, G2 with profile shapes which are not sinusoidal and gratings G1, G2 with relatively great profile heights has the result that the grating structure GS can be copied holographically only with extreme difficulty. In general only symmetrical profile shapes, in particular sinusoidal shapes, can be achieved with holographic methods. In the event of imitation by means of holographic methods, intermodulation effects occur, which result in the known speckle patterns, as are known for example from rainbow holograms. The result of those intermodulation effects is also that an entire range of very slight up to great profile heights occurs in the diffractive structures so that the diffraction efficiency which can be achieved is significantly smaller than with an optimised grating structure GS.

In addition, in the event of attempts at copying by means of holographic methods intermodulation terms generally occur between the various diffraction orders of the grating structures GS so that linked thereto there are unwanted diffraction orders which can troublesomely alter the impression perceived by a viewer.

The grating structures GS are preferably microscopically fine relief structures which are formed for example in the surface of a lacquer layer and which are covered with a protective lacquer layer. A preferably metallic layer or also a dielectric layer with a high refractive index can be embedded between the lacquer layer and the protective lacquer layer, to enhance the brilliance. The diffraction-effective relief structures are therefore disposed in the interface between two adjacent layers.

Some particular effects according to the invention are described in greater detail by means of embodiments with reference to the drawings. The individual embodiments are provided with separate titles, for the sake of enhanced understanding. However the examples can be combined together as desired and the description set forth in relation to one example may also apply in regard to another example without being repeated therein.

FIGS. 5 to 13 show various surface patterns and k- or k̃-planes which permit vivid analysis of the optical effects to be expected. In order not to encumber the drawings, in part only some of the diffraction orders are labelled. Such surface patterns serve in particular as optical information carriers such as for example optical security elements.

EXAMPLE 1 shown the two surface portions 11 and 12 preferably have common boundary lines and serve for mutual referencing. The surface portion 11 contains a first grating structure GS1 which corresponds to the superimposition of a first grating G1 with a second grating G2, wherein the difference of the azimuth angles $\Delta\psi(GS1)=\psi(G1)-\psi(G2)$ modulo 360° does not disappear and is for example $\Delta\psi=70°$.

The first grating G1 has a high number of lines of for example 1200 lines/mm and thus for perpendicularly incident light out of the well-visible part of the spectrum Γ because of the equation (1), a maximum of $p_1=3$ diffraction orders occur, with which the three k-vectors $k_{-1}(G1)$, $k_0(G1)$ and $k_{+1}(G1)$ are associated. The profile shape of the grating G1 is sinusoidal and the optically effective profile height, that is to say the product of the geometrical profile height h (FIG. 1) and the refractive index κ of the protective lacquer layer 5 (FIG. 1) which levels off the grating surface is so selected in accordance with FIG. 4 and equation (15) at 200 nm that the levels of intensity $I_{-1}$ and $I_{+1}$ of the two diffraction orders $m=-1$ and $+1$ are maximum at the expense of the intensity $I_0$ of the zero diffraction order.

The second grating G2 has a rather lower number of lines of for example 200 or 300 lines/mm, a sinusoidal and thus also symmetrical profile shape and an optically effective profile height of about 600 nm, so that, as can be seen from FIG. 4, the light is diffracted as uniformly as possible into the seven diffraction orders $j=-3, -2, -1, 0, 1, 2$ and $3$.

The surface portion 12 contains a second grating structure GS2 which is also produced by the superimposition of the first grating G1 and the second grating G2, wherein in the example further described hereinafter the difference of the azimuth angles $\Delta\psi(GS2)$ is equal to the value $-\Delta\psi(GS1)$.

The two surface portions 11 and 12 (FIG. 5a) are simultaneously in the field of vision for an observer of the surface pattern 10 (FIG. 5a). The optical diffraction activity of the surface portions 11, 12 is determined by their grating structure GS1 and GS2 respectively. For the purposes of easier analysis of the diffraction activity of the grating structures GS1 and GS2 the k̃-circle 9 is shown separately for the two grating structures GS1 and GS2 in FIGS. 5b and 5c. Likewise, for reasons relating to the drawing, only points $\tilde{P}_{n,m}(GS1)$ and $\tilde{P}_{n,m}(GS2)$ are shown for the three colours blue, green and red corresponding to the wavelengths $\lambda_1=450$ nm (blue), $\lambda_2=550$ nm (green) and $\lambda_3=650$ nm (red), even if the beam 1 (FIG. 2) which falls on the grating structures GS1 and GS2 respectively of the surface pattern 10 is polychromatic. The incident light is diffracted at different diffraction angles $\theta_{n,m}(\lambda)$ (FIG. 2) and respectively fanned out in different azimuthal directions $\phi_2(n,m)$ (FIG. 2). The points $\tilde{P}_{n,m}(GS1)$ and $\tilde{P}_{n,m}(GS2)$ respectively are associated with those diffraction orders into which the surface pattern 10 diffracts the 3-coloured light. It is now possible to imagine how the k̃-plane, upon rotation and tilting of the surface pattern 10, also moves in its plane, while it is possible to deduce from FIGS. 5b and 5c whether a and which diffraction order of which surface portion 11 and 12 respectively diffracts light of what colour into the eye of the observer. In regard to those considerations, the information content of both of FIGS. 5b and 5c is to be taken into account at the same time.

The term "rotating" is used hereinafter to mean that the surface pattern 10 is rotated about an axis which is perpendicular to the plane of the surface pattern 10. Upon rotation therefore the direction of incidence of the light with respect to the line 4 (FIG. 2) normal to the plane of the surface pattern 10 does not change, in other words only the angle $\phi_1$ changes but the angle $\Theta_1$ does not change. The term tilting means that the surface pattern 10 is rotated about an axis which is disposed in its plane. Upon tilting except in special cases both angles $\phi_1$ and $\Theta_1$ change, with the result that the points $\tilde{P}_{n,m}(GS1)$ and $\tilde{P}_{n,m}(GS2)$ move within the k̃-circle 9 and could also disappear.

Figure 5C:
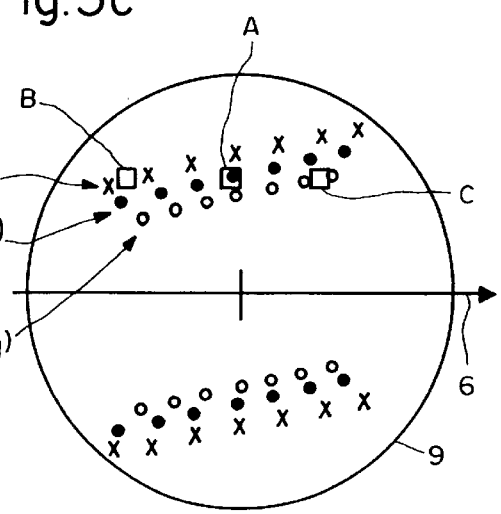

On the assumption that only the eye of a viewer rotates around the surface pattern 10 and thus there is no movement of the points $P_{n,m}(GS1,\lambda)$ and $P_{n,m}(GS2,\lambda)$ on the hemisphere 8 (FIG. 2) or within the k̃-circle 9, it is also possible to see from FIGS. 5b and 5c that in a first range of observation directions both surface portions 11 and 12 are visible in changing colours, the colour of each surface depending on the current observation direction. For example in the observation direction A the points $\tilde{P}_{1,0}(GS1)$ and $\tilde{P}_{1,0}(GS2)$ or the vectors $g_2(GS1)$ and $g_2(GS2)$ (FIG. 1) of the light diffracted at the surface portions 11 and 12 respectively fall one upon the other, that is to say both surface portions 11 and 12 and thus the entire surface pattern 10 are visible for the observer in the same colour, in this case green. The information formed by the graphic configuration of the two surface portions 11 and 12 is therefore not visible. In the observation direction B the surface portion 11 appears blue to the observer, and the surface portion 12 appears red, and thus the item of information "V" is clearly visible. In contrast, in the observation direction C the surface portion 11 shows red and the surface portion 12 shows blue, that is to say the colour contrast of the item of information V is reversed. In a second range of observation directions only the one surface portion 11 or 12 is visible in colour while the other surface portion 12 or 11 respectively appears dark. Finally, both surface portions 11 and 12 appear dark in a third range of observation directions.

The same considerations apply if the eye of the observer remains motionless and instead the surface pattern 10 is rotated and/or tilted. The described colour effects can be perceived in the same manner.

The use of grating structures which comprise at least two superimposed gratings affords the advantage over the surface pattern known from European patent EP 375 833 that even very fine lines can diffract light in a plurality of directions. In accordance with the teaching of EP 375 833, a surface portion would have to be provided for each diffraction direction, which quickly gives rise to resolution problems and increased expenditure in production of the embossing original.

EXAMPLE 2

FIG. 6a shows a further surface pattern 17 which is subdivided into three surface portions 11, 12 and 18. The two surface portions 11 and 12 each contain a respective grating structure GS1 and GS2 respectively. The grating structures GS1 and GS2 are both composed of the same superimposed gratings G1 and G2. They differ only in respect of their azimuthal orientation insofar as $\psi(GS2)=\psi(GS1)+180°$ modulo 360°. The grating G1 has about 1000 lines/mm, a symmetrical rectangular profile shape and an optically effective profile height h*κ (FIG. 1) of about 100 nm so that the three diffraction orders j=−1,0 and +1 all have a comparable level of intensity. The grating G2 also has about 1000 lines/mm, an optically effective profile height h*κ, (FIG. 1) of about 125 nm, but an asymmetrical triangular profile shape. The optically effective profile height h*κ of the grating G2 is so selected that in the wavelength range of 450 nm to 650 nm the intensity $I_{j=+1}$ is typically at least twice as great as the intensity $I_{j=-1}$ and that the intensity of the light $I_0$ which is diffracted into the zero diffraction order has a proportion of at least 15 percent of the total diffracted intensity. The surface portion 18 serves as a background surface. It may be for example in the form of an unembossed flat surface or it may be provided with known diffraction structures.

In FIGS. 6b and 6c the points $\tilde{P}_{n,m}(GS1)$ and $\tilde{P}_{n,m}(GS2)$ of the nine possible diffraction orders (m,n) are shown as circles within the $\tilde{k}$-circle 9, the diameter of the circles being shown in proportion to the intensity $I_{m,n}$. Three selected viewing directions 19,20 and 21 are marked with crosses. It can now be seen from the drawing that, from the viewing direction 19, the surface portion 11 appears in the same colour as the surface portion 12, but brighter. Both surface portions 11 and 12 appear in the same colour and with equal luminance from the viewing direction 20. In contrast from the viewing direction 21 the surface portion 12 appears brighter than the surface portion 11. From any observation direction into which light is diffracted, the surface portions 11 and 12 appear from one colour shade to another as a single-colour image, the colour of the image and the level of intensity of the light of the surface portions 11, 12 depending on the current observation direction within each diffraction order (m,n). Thus depending on the respective observation direction the two surface portions 11 and 12 are visible with differing contrast or even with the same degree of brightness in a contrastless manner. The image formed by the surface portions 11 and 12 is therefore visible as a whole as a bright colour or only as a dark surface. There is no viewing region in which the one surface portion 11 appears in a bright colour and the other surface portion 12 appears dark.

If the observer now looks onto the surface pattern 17 (FIG. 6a) successively from the observation directions 19, 19' and 19", then the surface portions 11 and 12 (FIG. 6a) always appear in an unaltered brightness relationship. Unlike the usual gratings where all diffraction orders in the $\tilde{k}$-plane are on a straight line (see FIG. 3) diffraction orders occur in the case of the grating structures GS1 and GS2 in different azimuthal directions. As described, this can be utilised on the one hand for novel visible effects with an optical-diffraction action. On the other hand, a single grating structure GS1 or GS2 already affords the possibility of verifying by machine the intensity relationships of a large number of diffraction orders as the diffraction orders are well-separated in regard to their spatial angle.

FIG. 7 shows another surface pattern 17 which is composed of graphic elements. The graphic elements in this case are ellipses which are formed from lines 22, 23 and which are shown in the drawing in the form of thin lines 22 and thick lines 23 while in actual fact they are of equal width. Each of the lines 22, 23 represents a surface portion which contains a predetermined grating structure GS1 and GS2 respectively. The area between the lines 22, 23 is for example a reflecting or matt or transparent surface. For all graphic elements the lines 22 may contain the same grating structure GS1 or another grating structure GS1', and the lines 23 likewise. A motif, which can be seen in form of a cross in the drawing because of the different line thicknesses, determines in respect of each graphic element which portions are occupied with which grating structure so that the surface pattern 17, under the predetermined viewing conditions, is visible in a condition of contrast to the surrounding area, or disappears. No limits are set in respect of the graphic configuration with lines, filigree-like patterns, surfaces etc.

The following examples deal with further grating structures GS which can be used in any surface pattern, for example the surface pattern 10 in FIG. 5a. It is assumed that such a surface pattern has various graphic elements such as points, lines and surfaces, which are provided with at least two different grating structures GS or gratings G1.

EXAMPLE 3

FIG. 8a shows the $\tilde{k}$-plane of a first grating structure GS1 which is composed of the gratings G3 and G4. The grating G3 corresponds to the grating G1 described with reference to FIG. 5a and has a line number L1 of 1200 lines/mm. It diffracts light predominantly into the two diffraction orders j=−1 and +1. The grating G4 has a small line number L2 of about 200 lines/mm and is of a sawtooth-shaped profile shape. The optically effective profile height h*κ (FIG. 1) is about 270 nm, that is to say half the wavelength λ of green light with λ=550 nm, so that the light is diffracted with the maximum amount of concentration into a single diffraction order, namely the diffraction order j=+1. In a first variant the two gratings G3 and G4 involve the same azimuthal orientation: ψ(G3)=ψ(G4). The k-vectors $k_j$ of the two gratings G3 and G4 therefore all point in the same direction. As the grating G3 only has two diffraction orders of high intensity, $I_{j=-1}$ and $I_{j=+1}$, and the grating G4 has only a single diffraction order of high intensity, $I_{j=1}$, the grating structure GS1, because of the equation (11), also has only two diffraction orders of high intensity, $I_{n=-1,m=1}$ and $I_{n=1,m=1}$. The diffraction angles $\theta_2(n=-1, m=1,\lambda)$ and $\theta_2(n=1,m=1,\lambda)$ are different, while in the case of a reference structure which is for example a reference grating Gr alone the diffraction angles $\theta_2(j=-1,\lambda)$ and $\theta_2(j=+1,\lambda)$ are equal. The reference grating Gr preferably has a number of lines Lr which is equal to the sum or the difference of the number of lines of the two gratings G3 and G4. In the example the number of lines Lr is therefore 1400 or 1000 lines/mm. The $\tilde{k}$-plane of the reference grating Gr is shown in FIG. 8b.

From the observation direction 24 which is marked with a square and which for the sake of clarity of the drawing is displaced somewhat towards the right, the graphic elements of the surface pattern 10 are visible in approximately the same colour, irrespective of whether they contain the grating structure GS1 or only the reference grating Gr. If the surface pattern 10 is rotated in its plane around 180° so as to go to the observation direction 25, then the graphic elements which are provided with the grating structure GS1 are visible in another colour from the graphic elements which are provided with the reference grating Gr if the points $\tilde{P}_{1,1}(GS1)$ and $\tilde{P}_1(Gr)$ in the $\tilde{k}$-plane are not too far away from each other. If that distance is sufficiently great, then in that azimuthal position of the surface pattern 10 either the graphic elements with the grating structure GS1 or the graphic elements with the reference grating Gr are visible in a bright colour while the others are only perceptible as a dark surface.

FIG. 9 shows the light beam I which impinges for example perpendicularly onto the grating structure GS1. As shown in FIG. 8a the light beam 1 is diffracted into the three diffraction orders (m=−1,n=1), (m=0,n=1) and (m=1,n=1).

The diffraction angles $\theta_2(m=-1,n=-1,\lambda)$, $\theta_2(m=0,n=1,\lambda)$ and $\theta_2(m=1,n=1,\lambda)$ of the three diffracted light beams 2 correspond to the number of lines 1000=1200−200 lines/mm, 200 lines/mm and 1400=1200+200 lines/mm of a conventional grating and therefore can be directly determined in accordance with equation (1) with $\theta_i=0°$ as the diffraction angle $\theta_j$ with j=1. Now, in the case of a holographic copy, only the positive diffraction orders with j=1 of gratings with L=1000 lines/mm, L=200 lines/mm and L=1400 lines/mm would not occur as in this example in accordance with the invention, but three additional light beams 2' would occur corresponding to the negative diffraction orders j=−1 of gratings with L=200 lines/mm, L=1000 lines/mm and L=1400 lines/mm. The additional light beams 2' are shown in the drawing with broken lines. With suitably arranged photodetectors 26, it is now possible to verify by machine which of the light beams 2 and 2' actually occur, and with what intensity.

The properties of the grating structure GS1 can therefore be verified by machine so that it is possible to forego the reference structure Gr.

In a second variant as shown in FIGS. 10a and 10b the two gratings G3 and G4 have an azimuthal orientation which is different by 90°:$\psi(G4)=\psi(G3)+90°$ In this case the reference grating Gr preferably has a number of lines Lr which by square addition is determined as:

$$Lr = \sqrt{L^2(G3) + L^2(G4)}$$

All graphic elements are simultaneously visible from the observation direction 27, only the graphic elements with the grating structure GS1 are visible in a bright colour from the observation direction 28, and only the graphic elements with the grating Gr are visible in a bright colour from the observation direction 29, which can be referred to as azimuthal separation.

EXAMPLE 4

The light which is diffracted at a grating G5 in the zero diffraction order, that is to say in mirror reflection, does not exhibit any dispersion: the direction of the diffracted light is independent of the wavelength $\lambda$. The level of intensity lo however is dependent on the wavelength $\lambda$. Thus, as can be deduced from FIG. 4 by skillful choice of the parameters of the grating G5, it is possible to provide that the light which is diffracted into the zero diffraction order appears in a predetermined colour when the incident light is white.

If the grating G6 has a small number of lines, of less than 250 lines/mm, a sawtooth-shaped profile shape and a relatively large optically active profile height h*κ (FIG. 1) of 1.5 μm, then the visible light is predominantly diffracted into a single or about 2 to 3 directly successive diffraction orders, wherein different colour components in the spectrum of the diffracted light are superimposed in such a way that the grating G6 appears to the viewer in a predetermined diffraction angle range as an achromatic surface. In other words, the polychromatic light is diffracted virtually independently of the wavelength $\lambda$ into a given diffraction angle range.

Colour effects which are new for the observer and which were hitherto not known from conventional gratings can be produced with a grating structure GS3 formed by the superimposition of the two gratings G5 and G6. FIG. 11a shows the $\tilde{k}$-plane of the grating G5. The polychromatic light which is diffracted into the zero diffraction order appears coloured, for example blue, to the human eye, even if a larger proportion of blue light is diffracted into the diffraction orders j=−1 and +1, than into the zero diffraction order. The diffraction orders j=−1 and +1 however have a dispersive behaviour. FIG. 11b shows the $\tilde{k}$-plane of the grating G6 which diffracts the light into three diffraction orders with a positive index j, which are closely together in terms of index and angle. FIG. 11c shows the $\tilde{k}$-plane of the grating structure GS3 for the situation where the superimposed gratings G5 and G6 have an azimuthal difference of $\Delta\psi=\psi$(G5)−$\psi$(G6) of 90°. In the entire diffraction angle range 30 the grating structure GS3 which is lit with polychromatic light appears to the observer as a blue surface. The typical rainbow colours of gratings do not occur upon tilting movement about an axis 34 which is parallel to the furrows 3 (FIG. 2) of the grating G6 contained in the grating structure GS3. In the diffraction angle ranges 31, 32 and 33, the grating structure GS3 also appears in a given colour upon tilting movement about the axis 34. In contrast, because of dispersion the grating structure GS3 appears in changing colours upon tilting movement about an axis 35 which is perpendicular to the axis 34. The surface portion 11 of the surface pattern 10 (FIG. 5a) has the grating structure GS3, while the surface portion 12 has a conventional grating G7 which serves for referencing and whose k-vectors $k_j$ point in the direction 36 indicated by the arrow. The surface portion 12 shows the dispersive rainbow effects when the surface pattern 17 is tilted about the axis 37 which is parallel to the furrow 3 (FIG. 2) of the grating G7.

In addition the grating structure GS3 and the grating G7, with suitable selection adapted to the grating structure GS3 in respect of the parameters line spacing and orientation $\psi$(G7) of the grating G7, are visible in the same colour, in a single observation direction 38. As soon as the surface pattern 10 however is rotated or tilted about any axis, the grating structure GS3 and the grating G7 light in different colours. Such an optical effect which is caused by the combination of the grating structure GS3 and the grating G7 cannot be produced with holographic methods.

EXAMPLE 5

The surface pattern 39 shown in FIG. 12a contains a pattern formed from discrete closed lines 40–45. The lines 40 and 41 form concentric circles while the other lines 42–45 form stars. Associated with each line 40–45 is a specific grating structure GS40 to GS45 which are composed of two superimposed gratings G8 and G9. The grating G8 corresponds for example to the grating G1 described with reference to FIG. 5a. It diffracts the light predominantly into the diffraction orders j=−1 and +1 and scarcely diffracts light into the zero diffraction order. The parameters of the grating G9 are so selected that the light is diffracted as uniformly as possible into the three diffraction orders j=−1, 0 and +1. As can be seen from FIG. 12b, the $\tilde{k}$-vectors of the gratings G8 and G9 associated with each line 40–45 are so established that the $\tilde{k}$-vector $\tilde{k}_1$(G8) of the gratings G8 has an orientation which is different by an azimuthal angle $\Delta\Psi$ of for example 15°, from one line to the next line, for example from the line 40 to the line 41, and from that to the line 42, etc. The $\tilde{k}$-vector $\tilde{k}_1$ of the gratings G9 are so selected that from each line 40–45 the sum vector $\tilde{k}_{1,1}$(GS)= $\tilde{k}_1$(G8)+$\tilde{k}_1$(G9) points to a common point S within the $\tilde{k}$-circle 9. Accordingly the behaviour of the pattern is as follows: a single one of the lines 40–45 is visible in each of the diffraction directions associated with the points $\tilde{P}_{1,0}$(GS40) to $\tilde{P}_{1,0}$(GS45). All lines 40–45 are simultaneously visible in the diffraction direction associated with the point S. For reasons of symmetry there is a second diffraction direction which is represented by the point S' and in which all lines 40–45 of the pattern are simultaneously visible. The length and direction of the k̃-vectors k̃$_1$(G9, GS40) to k̃$_1$(G9,GS45) of the grating G9 can be controlled in accordance with equations (2) and (4) by the choice of the line spacing d (FIG. 1) and the orientation of the furrows 3 (FIG. 2).

EXAMPLE 6

FIG. 13 shows the k̃-plane of the pattern illustrated in FIG. 12a. Each line 40–45 (FIG. 12a) again includes another grating structure GS40 to GS45 which are all composed of two superimposed gratings G8 and G9. While the grating G8 is the same for all lines 40–45 the grating G9 is a different one for each line 40–45. The parameters of the various gratings G9 are so selected that the tips of the sum vectors k̃$_{n=1,m=1}$(GSμ,λ)=k̃$_{n=1}$(G8,μ,λ)+k̃$_{m=1}$(G9,μ,λ), wherein the index μ with μ=40 to μ=45 respectively denotes the associated line 40–45 which for the same wavelength λ lie on a first straight line 46. The vector tips k̃$_{n=1,m=1}$(GSμ,λ) are shown in the drawing as points P̃$_{n,m}$(μ,λ), but only a few are labelled. In addition the gratings G9 diffract the light into the two diffraction orders j=1 and +1. There is therefore a second straight line 47 which is parallel to the first and on which the points P̃$_{n=1,m=-1}$(μ=40,λ) to P̃$_{n=j,m=-1}$(μ=45,λ) lie. If the grating G8 diffracts light into both diffraction orders j=−1 and +1, the other diffraction orders shown in the drawing also occur. If now the pattern is rotated and tilted in space in such a way that a diffraction order lying in the k̃-plane on a third straight line 48 always diffracts light into the eye of the observer, then the following happens:

- with the exception of transitional locations there are always two of the lines 40–45 that are simultaneously visible.
- one of those two lines 40–45 is visible in a first colour, while the other of the lines 40–45 is visible in a second colour which is different from the first.
- there appear in succession the first line in the first colour and the n-th line in the second colour then the second line in the first colour and the (n−1)-th line in the second colour, then the third line in the first colour and the (n−2)-th line in the second colour and lastly the n-th line in the first colour and the first line in the second colour.

In other words, when that rotary and tilting movement is performed, the star shown in FIG. 12a for example implodes in a blue colour from the outside inwardly and explodes in a red colour from the inside outwardly. Even if this play of colours does not come about by virtue of rotation of the pattern in its plane, an observer will easily learn and bring about the correct rotary/tilting movement in interactive play.

Both static effects and also dynamically kinematic effects can therefore be produced in a simple manner with grating structures formed from superimposed gratings. Dynamically kinematic effects occur when a plurality of graphic elements are formed from different grating structures, in which case at least one predetermined k-vector k̃$_{m,n}$(GS) obeys a predetermined law, in dependence on the grating structure GS and possibly also the wavelength λ.

A surface pattern which, like the surface pattern 10 shown in FIG. 5a, has surface portions 11, 12 of relatively large area can also be combined with an optical-diffraction structure as is known from European patent specification EP 105 099. In that case the surface portions 11, 12 serve as background while the additional structure which occupies only fractions of the surface portions 11, 12 furnishes a kinematic effect in the foreground.

The surface pattern can be formed for example as a composite laminate in accordance with the teaching of Swiss patent No. 678 835. The surface pattern may be in the form of a graphic design, in accordance with the teaching of Swiss patent specification No. 664 030.

Under certain circumstances some of the optical effects of the described examples could be imitated with surface patterns as are known for example from European patent specification EP 375 833. Particularly in the case of a surface pattern which is to be visible from a plurality of observation directions, in which however the optical impression of the surface pattern changes from one observation direction to another, a limit is very quickly reached, at which the number of surface portions required per pixel becomes so great that the individual surface portion becomes too small or the amount of space required for the pixel becomes too great. That results either in interference effects, as for example moire patterns can occur, or the poor resolution makes it impossible to represent fine lines. In accordance with the invention very fine lines can be produced without any problem, with the desired optical effects.

The invention has the advantage of a much higher level of diffraction efficiency than holographic attempts to produce such optical effects. In the case of a hologram the major part of the diffracted light would be concentrated in the vicinity of the mirror reflection The illustrated examples are all designed for viewing the reflected diffracted light. Optical surface patterns for transmitted diffracted light can also be formed in a similar manner.

We claim:

1. A surface pattern (10; 17; 39) having at least first and second surface portions (11; 12; 22; 23; 40 to 45) which are simultaneously in the field of vision of an observer, and contain microscopically fine light-diffracting relief structures disposed at the interface of two layers, and while illuminated with incident polychromatic light (1) the surface portions (11; 12; 22; 23; 40 to 45) light up in diffracted light (2) or become dark upon rotary and/or tilting movement depending on the direction of observation defined by the observer's eye, characterised in that at least the relief structure of the first surface portion (11; 22; 40) is formed by a superimposition GS1 of at least a first grating G1 and a second grating G2, with associated grating vectors k$_m$(G1) and k$_n$(G2), where m, n denote the respective order of diffraction, that the diffraction property of the superimposed relief structure of the first surface portion (11; 22; 40) is determined by the sumvector k$_{m,n}$(GS1) of the grating vectors k$_m$(G1) and k$_n$(G2), that the second surface portion (12; 23; 41 to 45) serving as mutual reference to the first surface portion (11; 22; 40) contains a grating structure G with the associated grating vector k(G) which is different from the superimposed grating structure GS1 of the first surface portion (11; 22; 40), and that the parameters of the grating vectors k$_m$(G1) and k$_n$(G2) used for the relief structure of the first surface portion (11; 22; 40) have those values that for a selected wavelength λ the sumvector k$_{m,n}$(GS1) of the superimposed grating GS1 is equal in magnitude and direction to the grating vector k(G) of the second surface portion (12; 23; 41 to 45) so that the first surface portion (11; 22; 40) and the second surface portion (12; 23; 41 to 45) both diffract light (2) of the same colour of the selected wavelength λ in the direction of observation (A; 20; 24; 27; 38; S; S') determined by the sumvector $k_{m,n}$(GS1) and its associated diffraction angle $θ_{m,n}$ of the superimposed grating GS1 but diffract light (2) of different colours in other directions.

2. A surface pattern (10; 17; 39) according to claim 1 characterised in that the relief structure of the grating vector $k_m$(G1) is sinusoidal and has a spatial frequency of about 1200 lines/mm and the relief structure of the grating vector $k_n$(G2) has a saw-tooth shaped profile and a spatial frequency of less than 300 lines/mm, and that the grating vector k(G) has a symmetric relief structure and a spatial frequency which is the difference or the sum of the spatial frequency of the relief structure of the grating vector $k_m$(G1) and of the spatial frequency of the grating vector $k_n$(G2).

3. A surface pattern (10; 17; 39) according to claim 2 characterised in that the grating vector $k_m$(G1) and the grating vector $k_n$(G2) are parallel.

4. A surface pattern (10; 17; 39) according to claim 2 characterised in that the grating vector $k_m$(G1) and the grating vector $k_n$(G2) are perpendicular.

5. A surface pattern (10; 17; 39) according to claim 1 characterised in that the grating structure G of the second surface portion (11; 22; 40) is formed by a second superposition GS2 of at least a third and a fourth grating G3 and G4 and that the grating vector k(G) is the sumvector $k_{m',n'}$(GS2) of the grating vectors $k_m$(G3) and $k_n$(G4), where m', n' denote the respective order of diffraction.

6. A surface pattern (10; 17; 39) according to claim 5 characterised in that the spatial frequency of the third grating G3 is equal or up to six times the spatial frequency of the fourth grating G4.

7. A surface pattern (10; 17; 39) according to claim 1 characterised in that the spatial frequency of the first grating G1 is equal or up to six times the spatial frequency of the second grating G2.

8. A surface pattern (10; 17; 39) according to claim 5 characterised in that the surface portions (11; 12; 22; 23; 40 to 45) have the superimposed grating structure GS1 with the grating vector $k_{m,n}$(GS1) and at least one superimposed grating structure GS2 with the grating vectors $k_{m,n}$(GS2), each one composed of the pair of the sinusoidal gratings G1,G2, and G3, G4 that the first grating vector $k_m$(G1) and the third grating vectors $k_m$(G3) differ only by azimuth angles ψ different for each pair of the first grating vector $k_m$(G1) and one of the third grating vectors $k_m$(G3), and that the magnitude and the direction of the second grating vector $k_n$(G2) and the fourth grating vectors $k_n$(G4) are predetermined by the sumvector $k_{m,n}$(GS1) of the grating vectors $k_m$(G1) and $k_n$(G2) which is equal to each of the sumvectors $k_{m,n}$(GS2) of the grating vectors $k_m$(G3) and $k_n$(G4) for the order of diffraction m=n=+1 or m=n=1.

9. A surface pattern (10; 17; 39) according to claim 8 characterised in that the first grating vector $k_m$(G1) and the third grating vectors $k_m$(G3) have the same spatial frequency of about 1000 to 1200 lines/mm.

10. A surface pattern (10; 17; 39) according to claim 5 characterised in that the profile of the four gratings G1, G2, G3 and G4 are sinusoidal, that the first and third grating vectors, $k_m$(G1) and $k_m$(G3), have an equal spatial frequency of more than 600 lines/mm, and the spatial frequency of the second and fourth grating vectors, $k_n$(G2) and $k_n$(G4), is about 300 lines/mm or less, and that the difference of the azimuth angles Δψ(GS1) of the first second and grating vectors $k_m$(G1) and $k_n$(G2) is equal to the negative difference of the azimuth angles Δψ(GS2) of the third and fourth grating vectors $k_m$(G3) and $k_n$(G4).

11. A surface pattern (10; 17; 39) according to claim 5 characterised in that a spatial frequency of about 1000 lines/mm is used for the four gratings G1, G2, G3 and G4, that the relief structure of the first and third grating vectors, $k_m$(G1) and $k_m$(G3), have a symmetrical rectangular profile shape and the relief structure of the second and fourth grating vectors, $k_n$(G2) and $k_n$(G4) is of an asymmetric triangular profile shape, and that the directions of the grating vector $k_{m,n}$(GS1) and of the grating vector $k_{m',n'}$(GS2) are anti-parallel.

12. A surface pattern (39) having at least two surface portions (40; 41; 42; 43; 44; 45) which are simultaneously in the field of vision of an observer, and contain microscopically fine light-diffracting relief structures disposed at the interface of two layers, and while illuminated with incident polychromatic light (1) the surface portions (40; 41; 42; 43; 44; 45) light up in diffracted, light (2) or become dark upon rotary and/or tilting movement depending on the direction of observation defined by the observers eye, characterised in that each of the surface portions (40; 41; 42; 43; 44; 45) have a different grating structure GS($μ$) formed as a superimposition of a first grating G1 with an associated grating vector $k_m$(G1) being the same for all surface portions (40; 41; 42; 43; 44; 45) and second gratings G2$μ$ with associated grating vectors $k_m$(G2, $μ$) being different for each surface portion (40; 41; 42; 43; 44; 45), where m, n denote the respective order of diffraction and the index $μ$ identifies the surface portions (40; 41; 42; 43; 44; 45), that the diffraction property of the superimposed relief structures GS($μ$) is determined for each of the surface portion (40; 41; 42; 43; 44; 45) by the sumvectors $k_{m,n}$(GS, $μ$) which are the sums of the grating vectors $k_m$(G1) and $k_n$(G2$μ$), that a first and a second wavelength $λ_1$ and $λ_2$ ($λ_1$≈$λ_2$) are selected as an additional parameter for the gratings G1 and G2$μ$ used in the superimposition GS($μ$) of each of the surface portions (40; 41; 42; 43; 44; 45) so that each superimposition GS($μ$) comprise a first sumvector $k_{m,n}$(GS, $μ$, $λ_1$) and a second sumvector $k_{m',n'}$(GS, $μ$, $λ_2$), that the surface portions (40; 41; 42; 43; 44; 45) are paired to serve as mutual reference and for each pair ($μ1$; $μ2$) the first gumvector $k_{m,n}$(GS, $μ1$, $λ_1$) of a first one ($μ1$) of the surface portions (40; 41; 42; 43; 44; 45) is equal in magnitude and direction to the second sumvector $k_{m',n'}$(GS,$μ2$, $λ_2$) of at least a second one ($μ2$) of the surface portions (40; 41; 42; 43; 44; 45), and the second sumvector $k_{m,n}$(GS, $μ1$, $λ_2$) of the first one ($μ1$) of the surface portions (40; 41; 42; 43; 44; 45) is equal in magnitude and direction to the first sumvector $k_{m',n'}$(GS, $μ2$, $λ_1$) of at least the second one ($μ2$) of the surface portions (40; 41; 42; 43; 44; 45), so that in a first direction of observation the first surface portion ($μ1$) diffracts light (2) of the first wavelength $λ_1$ and the associated second surface portion ($μ2$) diffracts light (2) of the second wavelength $λ_2$, and in a second direction of observation the first surface portion ($μ1$) diffracts light (2) of the second wavelength $λ_2$ and the associated second surface portion ($μ2$) diffracts light (2) of the first wavelength $λ_1$, and that the two directions of observation associated to the surface portions ($μ1$, $μ2$) are determined by the first sumvector $k_{m,n}$(GS, $μ1$, $λ_1$)=$k_{m',n'}$(GS, $μ2$, $λ_2$), and the second sumvector $k_{m,n}$(GS, $μ1$, $λ_2$)=$k_{m',n'}$(GS, $μ2$, $λ_1$), and their associated diffraction angles $θ_{m,n}$.

13. A surface pattern (10; 17) according to claim 1 characterised in that a third surface portion (18) has an unembossed reflecting flat surface.

* * * * *